(12) United States Patent
Ahuja et al.

(10) Patent No.: US 9,705,786 B2
(45) Date of Patent: Jul. 11, 2017

(54) DEMAND ADVERTISEMENT METHOD FOR SHARED MESH PROTECTION PATH COMPUTATION

(71) Applicant: Infinera Corp., Annapolis Junction, MD (US)

(72) Inventors: Satyajeet Ahuja, Cupertino, CA (US); Rajan Rao, Fremont, CA (US); Biao Lu, Saratoga, CA (US); Khuzema Pithewan, Karnataka (IN)

(73) Assignee: Infinera Corporation, Sunnyvale, CA (US)

( * ) Notice: Subject to any disclaimer, the term of this patent is extended or adjusted under 35 U.S.C. 154(b) by 615 days.

(21) Appl. No.: 13/931,469

(22) Filed: Jun. 28, 2013

(65) Prior Publication Data

US 2014/0226967 A1     Aug. 14, 2014

Related U.S. Application Data

(60) Provisional application No. 61/763,933, filed on Feb. 12, 2013.

(51) Int. Cl.
| | | |
|---|---|---|
| *H04B 10/00* | (2013.01) | |
| *H04J 14/00* | (2006.01) | |
| *H01S 3/00* | (2006.01) | |
| *H04B 10/08* | (2006.01) | |
| *H04B 17/00* | (2015.01) | |
| *H04L 12/703* | (2013.01) | |
| *H04L 12/707* | (2013.01) | |

(52) U.S. Cl.
CPC .............. *H04L 45/28* (2013.01); *H04L 45/22* (2013.01); *H04L 45/24* (2013.01)

(58) Field of Classification Search
CPC ....................................................... H04L 41/06
USPC ................................................. 398/5, 17, 33
See application file for complete search history.

(56) References Cited

U.S. PATENT DOCUMENTS

| | | | | |
|---|---|---|---|---|
| 9,172,625 | B2* | 10/2015 | Gruman .............. | H04L 43/0811 |
| 2003/0095500 | A1* | 5/2003 | Cao ..................... | H04J 14/0227 370/216 |
| 2003/0147352 | A1* | 8/2003 | Ishibashi ............. | H04J 14/0227 370/248 |
| 2003/0204595 | A1* | 10/2003 | Lev ..................... | H04L 12/2602 709/226 |
| 2003/0229807 | A1* | 12/2003 | Qiao ................... | H04J 14/0245 726/3 |
| 2004/0205237 | A1* | 10/2004 | Doshi ................. | H04L 41/0896 709/241 |
| 2005/0031339 | A1* | 2/2005 | Qiao ................... | H04L 41/0896 398/4 |

(Continued)

*Primary Examiner* — David Payne
*Assistant Examiner* — Pranesh Barua
(74) *Attorney, Agent, or Firm* — Dunlap Codding P.C.; David L. Soltz

(57) ABSTRACT

A method includes the steps of: (1) generating, by circuitry of a first node, an advertising message including (a) a working path bandwidth demand; (b) an identification of at least two communication links in a shared risk link group of the working path; and (c) at least one protecting path and a bitmap indicative of failure of at least one first communication link in the shared risk link group that causes the at least one protecting path to be used; and (2) transmitting the advertising message from the first node to second nodes within a mesh network.

7 Claims, 7 Drawing Sheets

| | $\psi_1$ | $\psi_2$ | $\psi_3$ | /—124 |
|---|---|---|---|---|
| (0,1) | 0 | 0 | 0 | |
| (1,2) | 0 | 0 | 0 | |
| (2,3) | 0 | 0 | 0 | |
| (0,6) | 0 | 0 | 0 | |
| (0,5) | 10 | 10 | 0 | |
| (5,6) | 0 | 0 | 0 | |
| (1,5) | 0 | 0 | 10 | |
| (2,5) | 10 | 10 | 0 | |
| (5,4) | 0 | 0 | 10 | |
| (3,4) | 0 | 0 | 10 | |

(56) References Cited

U.S. PATENT DOCUMENTS

| | | | | |
|---|---|---|---|---|
| 2005/0111349 A1* | 5/2005 | Vasseur | .................. | H04L 45/02 |
| | | | | 370/216 |
| 2005/0226212 A1* | 10/2005 | Dziong | .............. | H04L 12/4637 |
| | | | | 370/351 |
| 2005/0243711 A1* | 11/2005 | Alicherry | ............ | H04L 12/5601 |
| | | | | 370/216 |
| 2006/0004916 A1* | 1/2006 | Caviglia | ............. | H04L 41/0677 |
| | | | | 709/223 |
| 2007/0211732 A1* | 9/2007 | Suemura | ................ | H04L 45/28 |
| | | | | 370/400 |
| 2008/0131123 A1* | 6/2008 | Park | ......................... | H04J 3/14 |
| | | | | 398/66 |
| 2009/0034971 A1* | 2/2009 | Sadanada | ........... | H04L 43/0811 |
| | | | | 398/49 |
| 2009/0087180 A1* | 4/2009 | Allen | ................. | H04J 14/0227 |
| | | | | 398/45 |
| 2010/0074623 A1* | 3/2010 | Skoog | ................ | H04J 14/0212 |
| | | | | 398/79 |
| 2011/0305136 A1* | 12/2011 | Pan | .................... | H04L 41/0663 |
| | | | | 370/218 |
| 2012/0237200 A1* | 9/2012 | Wang | ................. | H04J 14/0268 |
| | | | | 398/5 |
| 2012/0307644 A1* | 12/2012 | Gandhi | .............. | H04L 41/0893 |
| | | | | 370/241 |
| 2013/0003728 A1* | 1/2013 | Kwong | .................. | H04L 45/02 |
| | | | | 370/389 |
| 2013/0232259 A1* | 9/2013 | Csaszar | .............. | H04L 43/0817 |
| | | | | 709/224 |
| 2014/0161437 A1* | 6/2014 | Miyabe | ............... | H04B 10/032 |
| | | | | 398/5 |

* cited by examiner

| | Ψ1 | Ψ2 | Ψ3 | |
|---|---|---|---|---|
| (0,1) | 0 | 0 | 0 | 124 |
| (1,2) | 0 | 0 | 0 | |
| (2,3) | 0 | 0 | 0 | |
| (0,6) | 10 | 10 | 10 | |
| (0,5) | 0 | 0 | 0 | |
| (5,6) | 10 | 10 | 10 | |
| (1,5) | 0 | 0 | 0 | |
| (2,5) | 0 | 0 | 0 | |
| (5,4) | 10 | 10 | 10 | |
| (3,4) | 10 | 10 | 10 | |

| | Ψ1 | Ψ2 | Ψ3 |
|---|---|---|---|
| (0,1) | 0 | 0 | 0 |
| (1,2) | 0 | 0 | 0 |
| (2,3) | 0 | 0 | 0 |
| (0,6) | 0 | 0 | 0 |
| (0,5) | 10 | 10 | 0 |
| (5,6) | 0 | 0 | 0 |
| (1,5) | 0 | 0 | 10 |
| (2,5) | 10 | 10 | 0 |
| (5,4) | 0 | 0 | 10 |
| (3,4) | 0 | 0 | 10 |

|  | Ψ1 | Ψ2 | Ψ3 | |
|---|---|---|---|---|
| $L_1$ | 0 | 0 | 145 | ← $D_1$ $D_5$ $D_8$ |
| $L_2$ | 0 | 0 | 0 | |
| $L_3$ | 0 | 0 | 0 | |
| $L_4$ | 0 | 0 | 0 | |
| $L_5$ | 0 | 0 | 0 | |
| $L_6$ | 0 | 0 | 0 | |
| $L_7$ | 0 | 0 | 0 | |
| $L_8$ | 0 | 0 | 145 | ← $D_1$ $D_5$ $D_8$ |
| $L_9$ | 0 | 0 | 0 | |
| $L_{10}$ | 140 | 0 | 0 | |

DEMAND ADVERTISEMENT METHOD FOR SHARED MESH PROTECTION PATH COMPUTATION

INCORPORATION BY REFERENCE

This application claims priority to the provisional patent application identified by U.S. Ser. No. 61/763,933 titled "Demand advertisement scheme for SMP path computation and crank back elimination," filed on Feb. 12, 2013, the entire content of which is hereby expressly incorporated herein by reference.

FIELD OF THE DISCLOSURE

The disclosure generally relates to methods and apparatuses in shared mesh protection networks for advertising traffic demand information (bandwidth and SRLGs information) that is used to construct conflict matrix for use in protecting path computation during setup. The method eliminates or significantly reduces protection path crank back possibilities and hence improves service provisioning time and survivability/resiliency. Though the methodologies set forth herein are in the context of a shared mesh network that is optically based, such methodologies may apply to all transport networks that utilize protection and recovery provisioning.

BACKGROUND

A circuit switched network usually includes multiple switch nodes which are arranged in a topology referred to in the art as a "shared mesh network". Within the shared mesh network, user traffic can be transported between any two locations using predefined connections specifying a working path including particular links and/or switch nodes for conveying the user traffic.

The switch nodes are provided with a control module. The control modules of the switch nodes function together to aid in the control and management of the circuit switched networks. The control modules can run a variety of protocols for conducting the control and management of the circuit switched networks. One prominent protocol is referred to in the art as "Generalized Multiprotocol Label Switching (GMPLS).

Generalized Multiprotocol Label Switching (GMPLS) includes multiple types of optical channel data unit label switched paths including protection and recovery mechanisms which specifies predefined (1) working connections (or paths) within a shared mesh network having multiple nodes and communication links for transmitting data between a headend node and a tailend node; and (2) protecting connections (or paths) specifying a different group of nodes and/or communication links for transmitting data between the headend node to the tailend node in the event that one or more of the working paths fail. A first node of a working path and/or a protecting path is referred to as a headend node. A last node of a working path and/or a protecting path is referred to as a tailend node. Data is initially transmitted over the optical channel data unit label switched path, referred to as the working path, and then, when a working path fails, the headend node or tailend node activates one of the protecting paths for redirecting data within the shared mesh network.

Shared Mesh Protection (SMP) is a common protection and recovery mechanism in transport networks, where multiple paths can share the same set of network resources for protection purposes.

An exemplary mesh network 100 is shown in FIG. 1, by way of example. In FIG. 1, the mesh network 100 includes switch nodes 102 (hereinafter referred to as "nodes" 102) and labeled as A, B, C, D, E, F, G, H, I, J and K. Some of the nodes 102 are denoted as a headend node 104 or tailend node 106 for a particular path in accordance to the path setup direction. Other nodes 102 are known as intermediate nodes 108. In this example, the mesh network 100 includes headend nodes 104-A and 104-K; tailend nodes 106-D and 106-H; and intermediate nodes 108-B, 108-C, 108-E, 108-F, 108-G, 108-I, and 108-J. The mesh network 100 in FIG. 1 also includes two working paths 110a and 110b; and two protecting paths 112a and 112b. Thus, the working paths 110a and 110b are formed by the nodes {104-A, 108-B, 108-C, 106-D}, and {104-K, 108-J, 108-I, 106-H} respectively; and the protecting paths 112a and 112b are formed by the nodes {104-A, 108-E, 108-F, 108-G, 106-D}, and {104-K, 108-G, 108-F, 108-E, 106-H} respectively. Connections are established via control planes prior to a failure of the mesh network 100. The switch nodes A-K are coupled by communication links 114a-k, which can be fiber optic cables, electronics cables, wireless communication links, or the like.

In this example, the communication links 114f and 114e between intermediate nodes 108-E, 108-F and 108-G are shared by both protecting paths 112a and 112b. The working paths 110 and the protecting paths 112 can be established by the nodes A-K using GMPLS protocols prior to any network failure. The working paths 110 and the protecting paths 112 may be bi-directional or co-routed, for example.

In Shared Mesh Protection, initially operators set up both working paths 110 and protecting paths 112. During setup, operators specify the network resources, for example, switch nodes A-K, communication links 114, and timeslots, for each path. The operators will activate the working paths 110 with the appropriate resources on the intermediate nodes 108; however, the protecting paths 112 will be reserved but the resources on the intermediate nodes 108 will not be initially activated. Depending on network planning requirements, such as Shared Risk Link Group (SRLG, including two or more links such as the communication links 114), protecting paths 112 may share the same set of resources on intermediate nodes 108-E, 108-F, and 108-G. The resource assignment is a part of the control-plane Connection Admission Control (CAC) operation taking place on each node.

Upon detection of working path 110 failure (for example, if the communication link 114b between intermediate nodes 108-B and 108-C is cut), the edgenode (headend node 104-A and/or tailend node 106-D) will transmit the activation messages to activate the protecting path 112a. By processing the activation messages, the intermediate nodes (108-E, 108-F, and 108-G) will program the switch fabric and configure the appropriate resources. Upon the completion of the activation, the edgenode (for example, headend node 104-A) will switch the user traffic to the protecting path 112.

In general, logical tables in one or more databases may be used to support protecting path 112 activation logic. Preferably, the tables include one or more connection tables, one or more logical timeslot tables, and one or more real timeslot tables. The connection table(s) maintains the connection-related information, including label, interfaces, and associated timeslot information for the connections. The logical timeslot table(s) is a timeslot translation table(s) between connections and timeslots. The real timeslot table(s) maintains the timeslot-related information, including the active connections that are currently conveying traffic and reserved connections for all timeslots. A reserved connection means there is not any active traffic on the timeslot. In the situation where a protecting path 112 is identified in the connection table, the protecting path's associated timeslots can be readily discovered utilizing the logic timeslot table and the real timeslot table. A common conflict matrix has been shared by the nodes 102 in the network 100, and may be used to avoid dropped or rejected connections due to insufficient bandwidth. However, the common conflict matrix did not indicate which SRLGs share bandwidth in the conflict matrix.

The protecting paths 112 play an important role in Shared Mesh Protection. However, there is no standard method in detecting which particular SRLGs are consuming resources on each communication link 114. Without having this information, the protecting connection setup could be directed via a link that may not have sufficient bandwidth to handle the traffic, and may reject the connection. This causes a protecting path 112 failure, and the intermediate node 108 may reject the connection, which forces the node upstream of the intermediate node 108 to set up a new protecting path 112. This is commonly known as "crankback" in network operation, and it causes significant delays in configuring shared mesh protection connections.

SUMMARY OF THE DISCLOSURE

In one aspect, the inventive concepts disclosed herein are directed to a method including generating, by circuitry of a first node, an advertising message. The advertising message includes a working path bandwidth demand, an identification of at least two communication links in a shared risk link group of the working path, and at least one protecting path and a bitmap indicative of failure of at least one first communication link in the shared risk link group that causes the at least one protecting path to be used. The method also includes transmitting the advertising message from the first node to second nodes within a mesh network.

The working path may include a first set of intermediate nodes and communication links, and the at least one protecting path may include a second set of intermediate nodes and communication links, the first set and the second set not overlapping with one another, or at least partially overlapping with one another.

The protecting path may be a first protecting path, and the advertising message may also include at least one second protecting path and a bitmap indicative of failure of at least one second communication link in the shared risk link group that causes the at least one second protecting path to be used.

The protecting path may be a first protecting path, the working path may be a first working path, and the advertising message may be a first advertising message, and the method may also include receiving, by circuitry of the first node, a second advertising message. The second advertising message may include a second working path bandwidth demand, an identification of at least two communication links in a shared risk link group of the second working path, at least one second protecting path and a bitmap indicative of failure of at least one link in the shared risk link group of the second working path that causes the at least one second protecting path to be used. The method may also include reserving bandwidth on the first node for the second protecting path based on the second advertising message, updating a conflict matrix to indicate of the reserved bandwidth for the at least one second protecting path, and transmitting a third advertising message from the first node to second nodes within the mesh network indicative of the reserved bandwidth for the at least one second protecting path.

In another aspect, the inventive concepts disclosed herein are directed to a method, including generating, by circuitry of a first node, an advertising message. The advertising message may include a working path protection type, the working path protection type being multi-failure recovery protection, a working path bandwidth demand, an identification of at least two communication links in a shared risk link group of the working path, and a set of protecting paths. The set of protecting paths may include a first protecting path and a bitmap indicative of failure of a first communication link in the shared risk link group that causes the first protecting path to be used, and at least one second protecting path and a bitmap indicative of failure of at least one second communication link in the shared risk link group that causes the at least one second protecting path to be used. The method may include transmitting the advertising message from the first node to second nodes within a mesh network.

The first protecting path and the at least one second protecting path may cooperate to protect the working path against failures of the first communication link in the shared risk link group and the at least one second communication link in the shared risk link group. The set of protecting paths may protect the working path from failures of the at least two links in the shared risk link group of the working path.

The working path may be a first working path and the advertising message may be a first advertising message, and the method may also include receiving, by the circuitry of the first node, a second advertising message including a second working path bandwidth demand, an identification of at least two links in a shared risk link group of the second working path, at least one third protecting path and a bitmap indicative of failure of at least one link in the shared risk link group of the second working path that causes the at least one third protecting path to be used. The method may also include reserving bandwidth on the first node for the at least one third protecting path based on the second advertising message, updating a conflict matrix to indicate the reserved bandwidth for the at least one third protecting path, and transmitting a third advertising message from the first node to second nodes within the mesh network indicative of the reserved bandwidth for the at least one third protecting path.

In yet another aspect, the inventive concepts disclosed herein are directed to a node, including an input interface for receiving traffic from a first communication link, an output interface for transmitting traffic to a second communication link, a switch for communicating the traffic from the input interface to the output interface, and a control module controlling the input interface, the output interface, and the switch. The control module may generate an advertising message including a working path bandwidth demand, an identification of at least two communication links in a shared risk link group of the working path, and at least one protecting path and a bitmap indicative of failure of at least one first communication link in the shared risk link group that causes the at least one protecting path to be used.

The working path may include a first set of intermediate nodes and communication links, and the at least one protecting path may include a second set of intermediate nodes and communication links, the first set and the second set not overlapping with one another, or at least partially overlapping with one another.

The at least one protecting path may be a first protecting path, and the advertising message may also include at least one second protecting path and a bitmap indicative of failure of at least one second communication link in the shared risk link group that causes the at least one second protecting path to be used.

The at least one protecting path may be a first protecting path, the working path may be a first working path, and the advertising message may be a first advertising message, and the control module may, in response to receiving a second advertising message reserve bandwidth on the node for the second protecting path based on the second advertising message. The second advertising message may include a second working path connection type, a second working path bandwidth demand; an identification of at least two communication links in a shared risk link group of the second working path, at least one second protecting path and a bitmap indicative of failure of at least one link in the shared risk link group of the second working path that causes the at least one second protecting path to be used. The control module may also update a conflict matrix indicative of the reserved bandwidth for the at least one second protecting path.

In a further aspect, the inventive concepts disclosed herein are directed to a node including an input interface for receiving traffic from a first communication link, an output interface for transmitting traffic to a second communication link, a switch for communicating the traffic from the input interface to the output interface, and a control module controlling the input interface, the output interface and the switch. The control module may generate an advertising message including a working path protection type, the working path protection type being multi-failure recovery protection, a working path bandwidth demand, an identification of at least two communication links in a shared risk link group of the working path, and a set of protecting paths. The set of protecting paths may include a first protecting path and a bitmap indicative of failure of a first communication link in the shared risk link group that causes the at least one protecting path to be used, and at least one second protecting paths and a bitmap indicative of failure of at least one second communication link in the shared risk link group that causes the at least one second protecting path to be used.

The first protecting path and the at least one second protecting path may cooperate to protect the working path against failures of the first communication link in the shared risk link group and the at least one second communication link in the shared risk link group. The set of protecting paths may protect the working path from failures of the at least two links in the shared risk link group if the working path.

The working path may be a first working path and the advertising message may be a first advertising message, and the control module may, in response to receiving a second advertising message reserve bandwidth for the at least one third protecting path based on the second advertising message. The second advertising message may include a second working path bandwidth demand; an identification of at least two links in a shared risk link group of the second working path, at least one third protecting path and a bitmap indicative of failure of at least one link in the shared risk link group of the second working path that causes the at least one third protecting path to be used. The control module may also update a conflict matrix indicative of the reserved bandwidth for the at least one third protecting path.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 11 is a diagram showing local calculation of an aggregated conflict matrix at each node according to the inventive concepts disclosed herein.

DETAILED DESCRIPTION OF EXEMPLARY EMBODIMENTS

Figure 1:
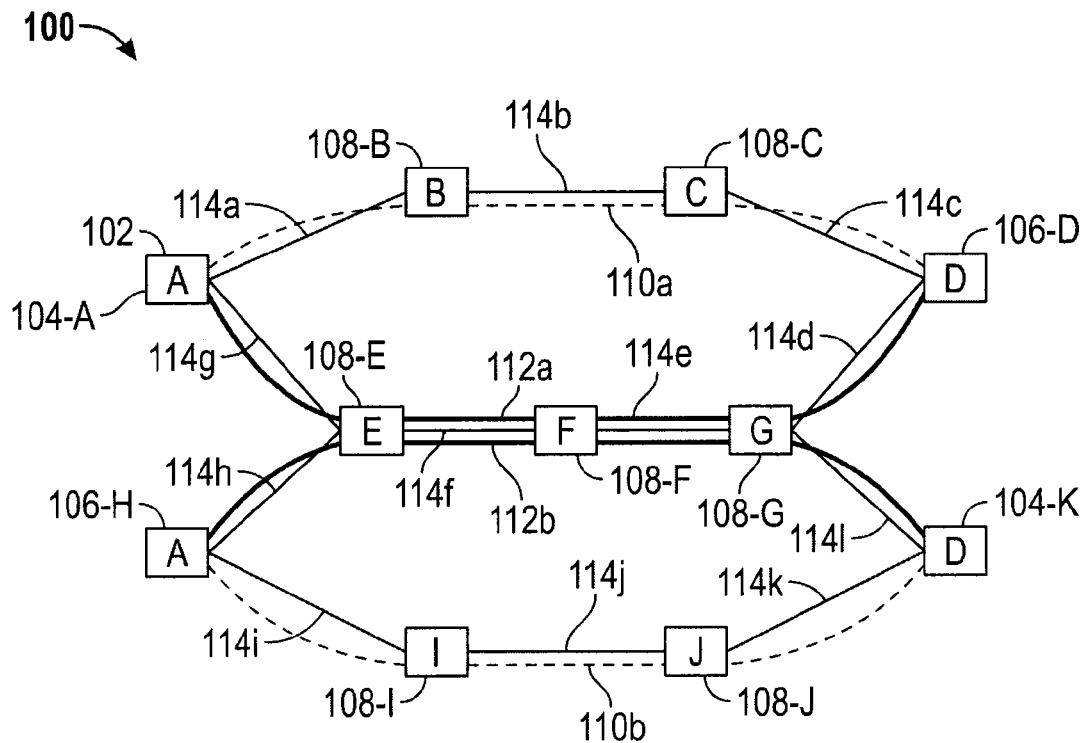
FIG. 1 is an example of a mesh network with Shared Mesh Protection.

The following detailed description refers to the accompanying drawings. The same reference numbers in different drawings may identify the same or similar elements or features.

If used throughout the description and the drawings, the following short terms have the following meanings unless otherwise stated:

Crankback is a mechanism used by networks when a connection setup request is blocked at an intermediate node because a node (e.g., an intermediate node) along a selected path cannot accept the request (e.g., due to lacking sufficient available bandwidth). In this case, the path is rolled back to a previous (or upstream) node, which attempts to discover another path to the final destination (i.e., the tailend node).

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

IETF stands for Internet Engineering Task Force.

IP stands for Internet Protocol which is a protocol used for communicating data across a packet-switched internetwork using the Internet Protocol Suite, also referred to as TCP/IP.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OSC stands for Optical Supervisory Channel which is an additional wavelength that normally carries network management information within an optical network.

OTN stands for Optical Transport Network which includes a set of optical switch nodes which are connected by optical fiber links. ITU-T recommendations G.709 and G.872 define OTN interface requirements and network architecture respectively.

SONET/SDH stands for Synchronous Optical Networking/Synchronous Digital Hierarchy which are standardized multiplexer protocols that transfer multiple digital bit streams over optical fiber using lasers or light emitting diodes.

TE stands for traffic engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The inventive concepts disclosed herein are directed to methods, devices, and systems utilizing network nodes and link bandwidths in a manner that advertises available protecting path bandwidth for each node in the network and which SRLGs share the reserved or consumed bandwidth at each node. Control planes of the nodes in the network advertise sufficient network state information that allows working paths and shared mesh protected (SMP) path computation at an arbitrary node in a network taking into account known shared risk link group (SRLG) failures.

Figure 2:
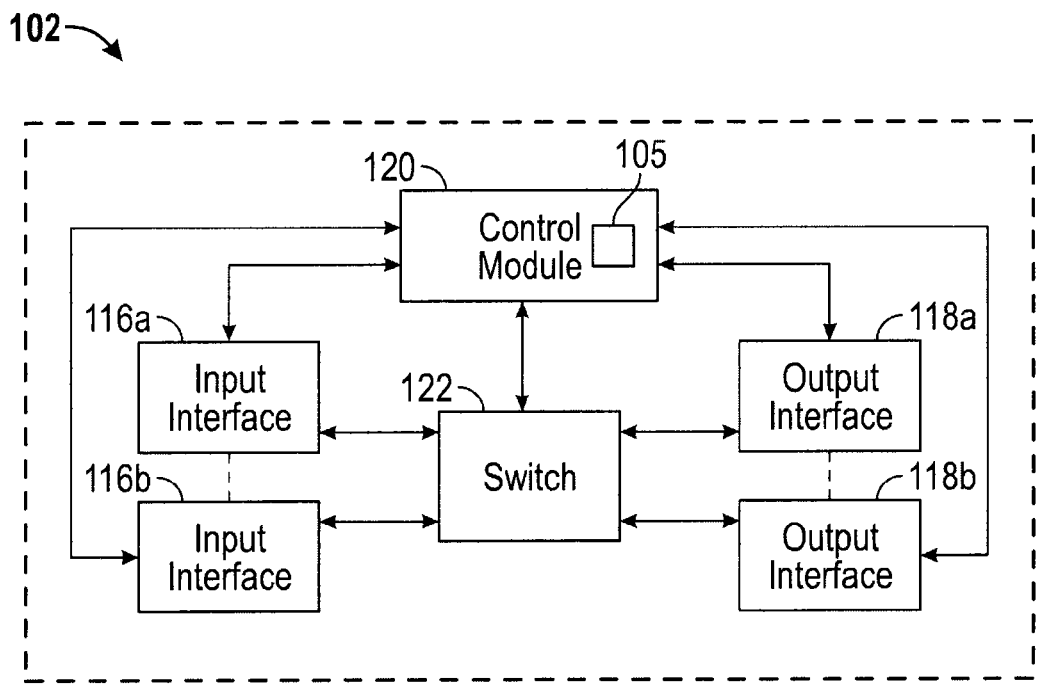
FIG. 2 is a block diagram of an exemplary node constructed in accordance with the inventing concepts disclosed herein for communicating via the mesh network of FIG. 1.

Referring now to the drawings, and in particular to FIG. 2, shown therein and designated by reference numeral 102 is an exemplary node constructed in accordance with the present disclosure. As will be discussed in more detail below, the node 102 is adapted to facilitate the communication of data (which may be referred to herein as "traffic") between multiple nodes 102 in a mesh network (e.g., the mesh network 100 shown in FIG. 1). The node 102 is provided with one or more input interfaces 116, one or more output interfaces 118, a control module 120, and a switch 122. The nodes A-K in FIG. 1 can be constructed in a similar manner as the node 102.

In general, the input interfaces 116 are adapted to receive traffic from the mesh network 100, and the output interfaces 118 are adapted to transmit traffic onto the mesh network 100. The switch 122 serves to communicate the traffic from the input interface(s) 116, to the output interface(s) 118. And, the control module 120 serves to control the operations of the input interfaces 116, the output interfaces 118, and the switch 122.

The control module 120 may run GMPLS and can be referred to herein as a control plane. The control plane may use GMPLS protocols to setup one or more working paths 110 and one or more protecting paths 112 during a negotiation. During the negotiation between the control planes of the nodes 102 within the mesh network 100 (e.g., as illustrated in FIG. 1), labels may be allocated for in-band signaling as part of the GMPLS processing, for example, as will be appreciated by persons of ordinary skill in the art having the benefit of the instant disclosure.

The node 102 can be implemented in a variety of manners, including commercial installations having one or more backplanes (not shown), racks, and the like. In this example, the input interfaces 116, the output interfaces 118, the control module 120 and the switch 122 are typically implemented as separate devices, which may have their own power supply, local memory and processing equipment. In another example, the node 102 can be implemented as a single device having a shared power supply, memory and processing equipment. Or, in another example, the node 102 can be implemented in a modular manner in which one or more of the input interfaces 116, the output interfaces 118, the control module 120 and the switch 122 share a power supply and/or housing.

The input interfaces 116, and the output interfaces 118 of one node 102 are adapted to communicate with corresponding input interfaces 116, and output interfaces 118 of another node 102 within the mesh network 100 via a communication link 114 (as shown in FIG. 1). An example of an input interface 116 and/or an output interface 118 is an Ethernet card or optical port. In general, each of the input interfaces 116 and/or the output interfaces 118 may have a unique logical identification, such as an IP address. The communication link 114 can be implemented in a variety of manners, such as a physical link including electrical (e.g., copper wire or coax) and/or optical signal (e.g., optical fiber or other waveguide) carrying capabilities, or as a wireless link. The implementation of the input interfaces 116, and the output interfaces 118 will depend upon the particular type of communication link 114 that the particular input interface 116 and/or output interface 118 is designed to communicate with. For example, one of the input interfaces 116 can be designed to communicate wirelessly with another node 102 within the mesh network 100, while one of the output interfaces 118 of the node 102 can be designed to communicate optically through a fiber-optic link. For a particular node 102, the input interfaces 116 can be of the same type or different types; the output interfaces 118 can be of the same type or different types; and the input and output interfaces 116 and 118 can be of the same type or different types.

In accordance with the present disclosure, messages transmitted between the nodes A-K, can be processed by circuitry within the input interface(s) 116, and/or the output interface(s) 118 and/or the control module 120. Circuitry could be analog and/or digital, components, or one or more suitably programmed microprocessors (e.g., processor 105) and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient or non-transitory memory. Exemplary non-transient memory includes random access memory, read only memory, flash memory or the like. Such non-transient memory can be electrically based or optically based. Further, the messages described herein may be generated by the components and result in various physical transformations.

It should be understood that the node 102 can be implemented in a variety of manners including those shown and discussed in U.S. Patent Publication No. 2009/0245289 entitled "Programmable Time Division Multiplexed Switching" the entire content of which is hereby incorporated herein by reference.

Figures 3, 4:
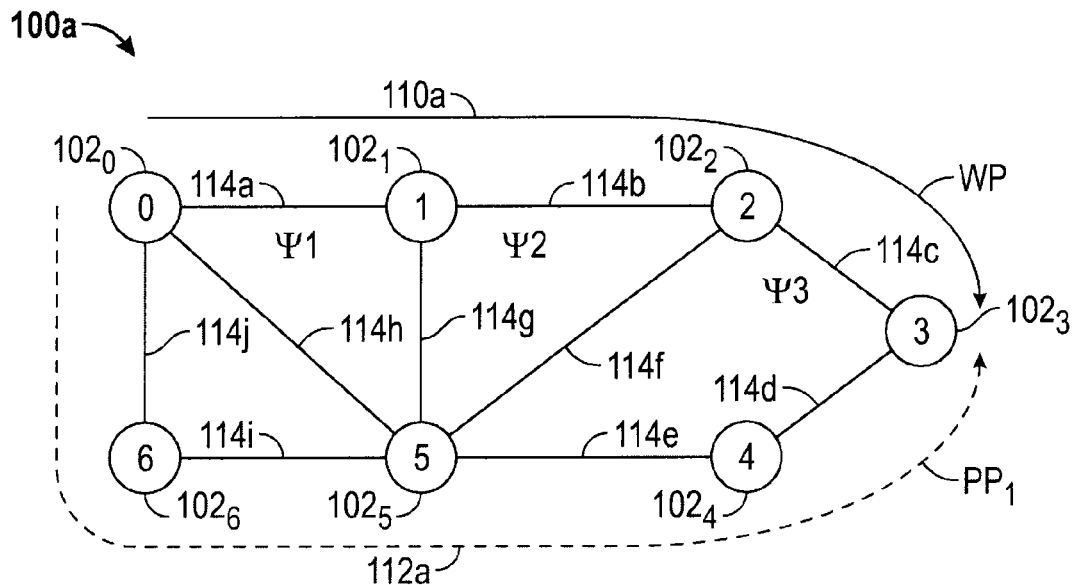
FIG. 3 is an exemplary embodiment of a first connection including a working path and a protecting path in a shared mesh protection network according to the inventive concepts disclosed herein.
FIG. 4 shows a conflict matrix updated to reflect bandwidth consumption by protecting path(s) on a given TE link.
Figure 5:
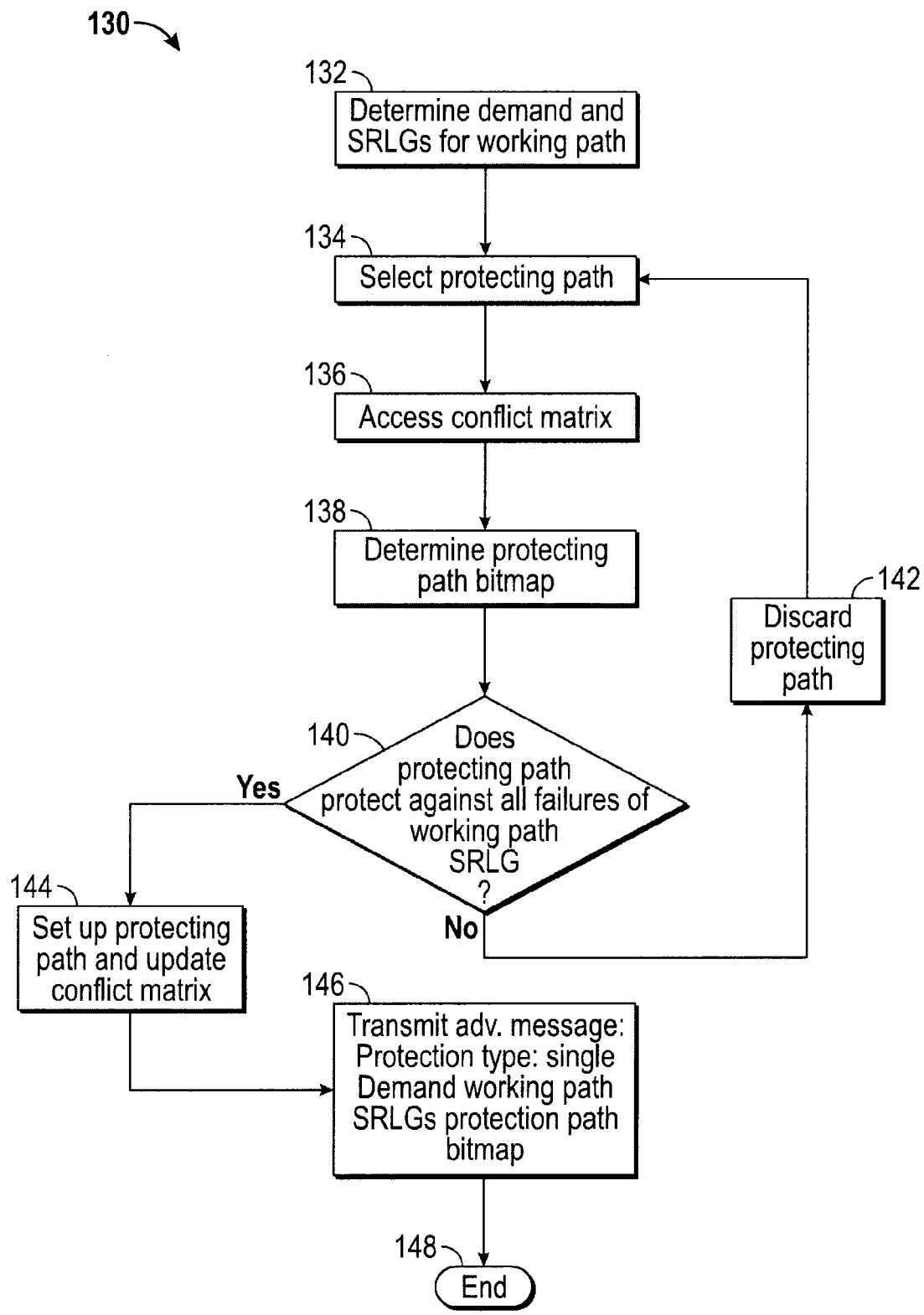
FIG. 5 is a diagram of an exemplary embodiment of a logic flow of setting up a single-SRLG failure connection using a demand advertisement method according to the inventive concepts disclosed herein.

Referring now to FIGS. 3-5, shown therein is an exemplary embodiment of a demand advertisement scheme for SMP path computation in a network 100a which may be implemented similarly to the network 100. As shown in FIG. 3, the network 100a includes seven nodes 102 (labeled $102_0$-$102_6$), which communicate via links 114. In this exemplary embodiment, for a particular working path 110a, the node $102_0$ is shown as the headend node, and the node $102_3$ is shown as the tailend node. The working path 110a (labeled as WP in FIG. 3) is set up between node $102_0$ and node $102_3$, via intermediate nodes $102_1$ and $102_2$ (e.g., by including nodes $102_0$-$102_1$-$102_2$-$102_3$). In this embodiment, the working path 110a has a SRLG including the links 114a, 114b, and 114c, which may also be expressed as links 0-1, 1-2, and 2-3. The links 114a (or 0-1), 114b (or 1-2), and 114c (or 3-2), may have respective designated failure risks or failure risk identifications $\psi_1$, $\psi_2$, and $\psi_3$, for example. As will be appreciated by a person of ordinary skill in the art, if any one of the links 114a (or 0-1), 114b (or 1-2), and 114c (or 3-2) in the SRLG fails, the SRLG fails and the working path 110a fails.

Further, a protecting path 112a (labeled as PP1) may be set up between node $102_0$ and node $102_3$, such as via intermediate nodes $102_0$-$102_6$-$102_5$-$102_4$-$102_3$, for example, or via any other desired intermediate nodes 102. As can be seen in FIG. 3, in some exemplary embodiments, the intermediate nodes 102 included in the working path 110a (i.e., nodes $102_1$ and $102_2$) and the intermediate nodes 102 included in the protecting path 112a (i.e., nodes $102_6$, $102_5$, and $102_4$) do not overlap, so as to minimize the chances of simultaneous failures of both the working path 110a and the protecting path 112a. This may be particularly advisable where a single protecting path 112a is used to protect the working path 110a, as will be appreciated by persons of ordinary skill in the art having the benefit of the instant disclosure. It is to be understood that in some exemplary embodiments, one or more of the intermediate nodes 102 in the working path 110a and one or more of the intermediate nodes 102 in the protecting path 112a may overlap, such that the working path 110a and the protecting path 112a at least partially overlap with one another.

As shown in FIG. 4, the headend node (node $102_0$ in this instance) may construct and store a conflict matrix 124. For example, the conflict matrix 124 may be constructed by defining a conflict matrix V for the network 100a, where $V(L_j, \psi_i)$ is the total SMP protecting capacity required on link $L_j$ due to the failure of a SRLG $\psi_i$. The conflict matrix 124 includes rows which represent the number of links 114 in the network 100a (multiple line modules on a link may be counted as multiple parallel links), and columns which represent the SRLGs for at least one protecting path 112a set up in the network 100a which may use the same timeslots as the working path 110a. Conflict matrices such as the conflict matrix 124 are advantageous because they aggregate the connection information in the form of bandwidth consumption per SRLG per TE-link for the network 100a. The size of the conflict matrix 124 is determined not by the number of paths or connections in the network 100a, but by the number of links 114 and SRLG in the network 100a.

In order to determine the working path 110a and the protecting path 112a, the conflict matrix 124 may be used by the headend node $102_0$. For example, in source based routing, the protecting path 112a computation may be carried out at any arbitrary node 102, and each node 102 in the network 100a preferably knows the conflict matrix 124.

The conflict matrix 124 may be stored on one or more non-transitory computer readable medium and executed by one or more processors (105 in FIG. 2) of the control module 120 of each of the nodes 102 in the network 100a. Exemplary non-transitory computer readable mediums may include read-only memory, random access memory, an EEPROM, a hard disk, solid-state drive, flash memory, an optical disk, combinations thereof or the like. The conflict matrix 124 may be data structure and may be a table in a stored memory. The columns of the conflict matrix 124 represent the SRLGs in the network 100a, and the rows of the conflict matrix 124 represent the number of links 114 in the network 100a (e.g., multiple line modules of a link 114 may be counted as multiple parallel links 114).

In order to enable the nodes 102 to update their respective conflict matrices 124 and to minimize or substantially eliminate crankback, the headend node $102_0$ may advertise to the rest of the nodes 102 in the network 100a some or all of the following information (e.g., via an advertising message sent via the control plane), working path 110a, working path 110a bandwidth demand (e.g., bandwidth demand such as demand D1 with 10 G capacity); protection type for the working paths 110a (e.g., SMP with single SRLG link failure protection, two protecting paths, or SMP with multi-SRLG failure protection); two or more links 114 in a SRLG of the working path 110 (e.g., $\psi_1$, $\psi_2$, $\psi_3$); at least one protecting path 112a (e.g., protecting path $1=\{100_0\text{-}100_6\text{-}100_5\text{-}100_4\text{-}100_3\}$); and for each protecting path 112a, a bitmap (e.g., $\{1,1,1\}$) showing a failure of working path 110a SRLGs that can be protected against by the protecting path 112a (e.g., that causes the protecting path 112a to be used).

The information may be advertised to the nodes 102 in the network 100a via one or more control plane advertising messages, which may be transmitted by the headend node $102_O$ over an in-band control channel or an out-of-band control channel. In the exemplary embodiment shown in FIG. 3, the advertisement message may include: protection path-single protecting path; demand D1 with 10 G capacity; working path 110a SRLGs=$\{\psi_1, \psi_2, \psi_3\}$; protecting path 112a=$\{0$-$6$-$5$-$4$-$3\}$; and bitmap=$\{1,1,1\}$ for the protecting path 112a, indicating that the protecting path 112a protects against failures in any of $\psi_1$, $\psi_2$, $\psi_3$. This advertising message may be received by the nodes 102 in the network 100a and may indicate to the nodes 102 in the network 100a to reserve the demand bandwidth (10G) at each link 114 (e.g., 0-6, 6-5, 5-4, 4-3) in the protecting path 112a (e.g., for the same time slots for which the data is sent over the working path 110a), and to update their respective conflict matrices 124 with the reserved protecting path 112a bandwidth for each link 114. The advertising message also indicates to the nodes 102 which protecting paths 112 share the reserved bandwidth on each link 114.

As will be appreciated by persons of ordinary skill in the art having the benefit of the instant disclosure, two or more, or with multiple protecting paths 112a may be set up for the same working path 110a, and based on protection type, and resources shared by the SRLGs of the protecting paths 112 for each link 114 are advertised and entered in the respective conflict matrices 124 for the nodes 102. For example, as shown in FIG. 4, the conflict matrix 124 has ten rows, (one for each of the links 114), and three columns (one for each failure risk, e.g., $\psi_1$, $\psi_2$, $\psi_3$ of the working path 110a SRLGs). In some exemplary embodiments, the conflict matrix 124 may include ten columns (one for the failure risk for each of the ten links 114 in the network 100a), although only three failure risks (one for each link in the working path 110a) are shown in FIG. 4 for simplicity. The conflict matrix 124 may reflect the demand the protecting path 112a places on the nodes 102 in the network 100a, i.e., the current bandwidth reserved and/or consumed at each node 102 by the existing protecting path(s) 112a in the network 100a, and which particular working path 110a SRLGs share the reserved bandwidth at each node 102.

A node, such as the headend node $102_O$ during path computation checks the conflict matrix 124 to determine available bandwidth for at least one protecting path 112a on the nodes 102 in the network 100a, and sets up the protecting path 112a via intermediate nodes 102 having available bandwidth.

Referring now to FIG. 5, a logic flow diagram of an exemplary embodiment of a logic sequence 130 executed by the node $102_O$ to set up a single SRLG link failure protection connection for the working path 110 as shown in FIG. 3 may be performed by one or more components (e.g., the processor 105) within the node $102_O$, for example.

The logic sequence 130 begins with a step 132, which includes the node $102_O$ determining the SRLGs (e.g., two or more links 114 such as $\psi_1$, $\psi_2$, $\psi_3$) of the working path 110a and the demand for the working path 110a. For example, the node $102_O$ may read the network 100a topology and information from one or more databases such as a Traffic Engineering Database, which is well known in the art, to determine the links 114 and intermediate nodes 102 that are included in the SRLGs of the working path 110a.

In a step 134, the node $102_O$ may select a protecting path 112a through the network 100a, for example, between the headend node $102_O$ and the tailend node $102_3$.

In a step 136, the node $102_O$ may access its conflict matrix 124.

In a step 138, the node $102_O$ may calculate, or otherwise determine a bitmap for the protecting path 112a selected in step 134. The bitmap is indicative of whether the selected protecting path 112a protects the working path 110a in case of failures of any one of the SRLGs (e.g., $\psi_1$, $\psi_2$, $\psi_3$) of the working path 110a.

Next, in a decision step 140, the node $102_O$ may determine if the selected protecting path 112a protects the working path 110a against all possible failures of the SRLGs of the working path 110a, for example by accessing the bitmap. The bitmap may include a bit, a flag or other suitable identifier, identifying whether the selected protecting path 112a protects the working path 110a against failure for any one of the working path 110a SRLGs (e.g., 1 for yes, and 0 for no).

If the selected protecting path 112a does not protect the working path 110a against failure of any one of the working path 110a SRLGs (e.g., $\psi_1$, $\psi_2$, $\psi_3$), the selected protecting path 112a may be discarded in a step 142, and the sequence 130 may cycle back to step 134.

If the selected protecting path 112a does protect the working path 110a against failure of any of the working path 110a SRLGs (e.g., as indicated by the bitmap), the node $102_O$ may set up the selected protecting path 112a and update its conflict matrix 124 in a step 144.

In a step 146, the node $102_O$ may transmit an advertising message to one or more second nodes 102 in the network 100a, including the protection type (e.g., single protecting path in this case), the working path 110a identification, the working path 110a bandwidth demand and SRLGs, the selected protecting path (e.g., 112a), and the bitmap for the selected protecting path 112a.

The sequence 130 ends in a step 148.

As will be appreciated by a person of ordinary skill in the art, each of the nodes 102 in the network 100a may receive the advertising message and may update their respective conflict matrix 124 to reflect the currently reserved bandwidth at each link 114 in the network 100a, and the working path 110a SRLGs sharing such reserved bandwidth.

Figures 6, 7:
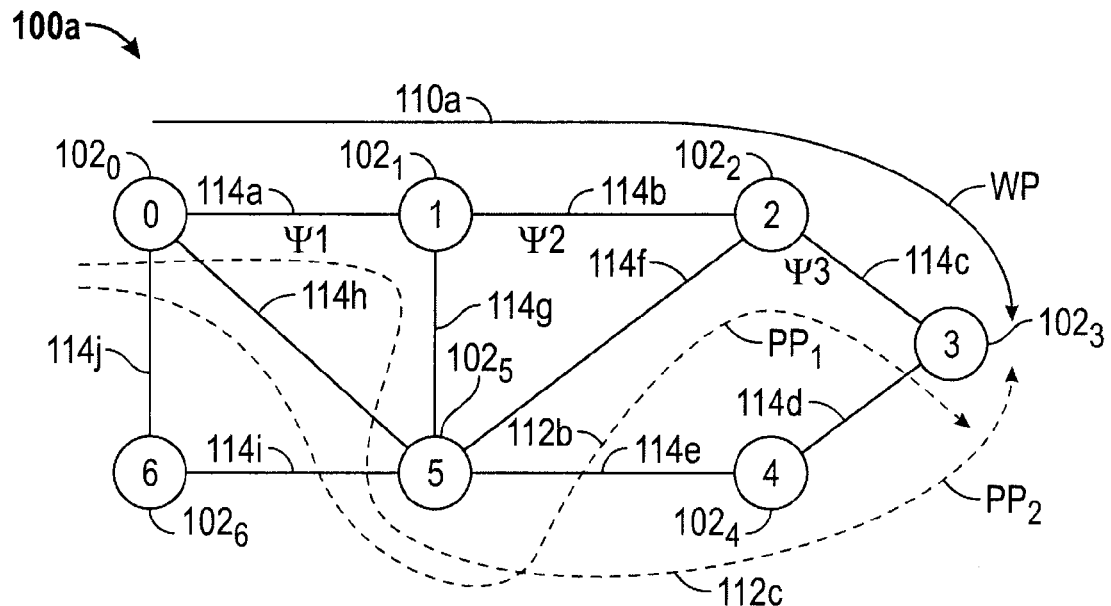
FIG. 6 is an exemplary embodiment of a second connection including a working path and two protecting paths according to the inventive concepts disclosed herein.
FIG. 7 shows a conflict matrix according to the inventive concepts disclosed herein that is updated to reflect additional protecting paths.
Figure 8:
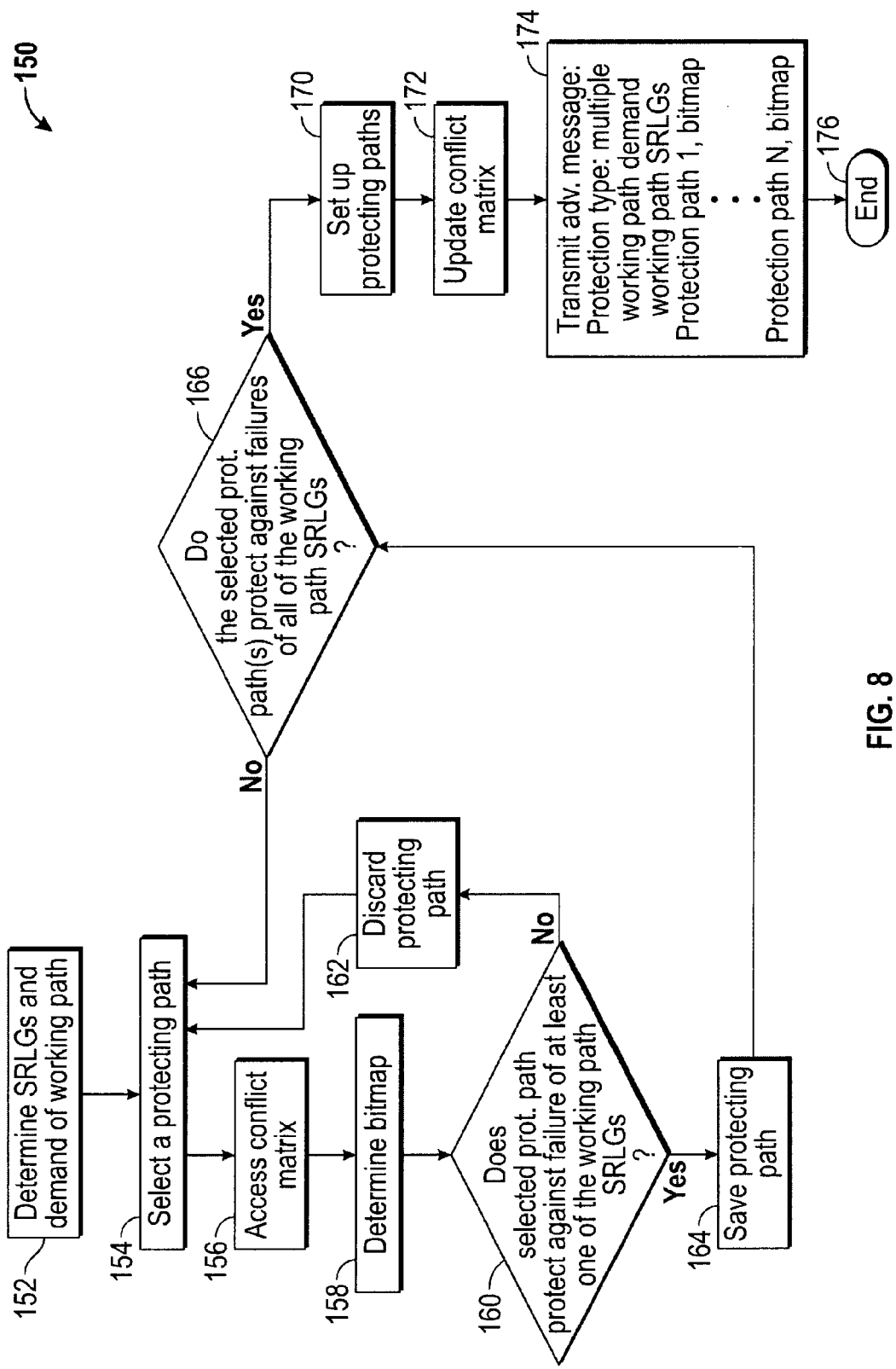
FIG. 8 is a diagram of an exemplary embodiment of a logic flow of setting up a multi-SRLG failure connection using a demand advertisement method according to the inventive concepts disclosed herein.

Referring now to FIGS. 6-8, in another exemplary embodiment, a headend node $102_O$ may attempt to set up the working path 110a and two protecting paths, a first protecting path 112b (PP1), and a second protecting path 112c (PP2) in the network 100a. The first protecting path 112b may utilize nodes $102_O$-$102_5$-$102_2$-$102_3$, and the second protecting path 112c may utilize nodes $102_O$-$102_5$-$102_4$-$102_3$. In this instance, the headend node $102_O$ may advertise to the nodes 102 of the network 100a the following information:

Protection type—two protecting paths
Demand D1 with 10 G capacity;
Working Path 110a SRLGs=$\{\psi_1, \psi_2, \psi_3\}$;
Protecting Path 112b=$\{0$-$5$-$2$-$3\}$ BitMap=$\{1,1,0\}$;
Protecting Path 112c=$\{0$-$1$-$5$-$4$-$3\}$; BitMap=$\{0,0,1\}$;

In this exemplary embodiment, the first protecting path 112b and the second protecting path 112c are shown as at least partially overlapping with the working path 110a (e.g., at nodes $102_2$ and $102_1$, respectively). As will be appreciated by a person of ordinary skill in the art, this embodiment results in a portion of the working path 110a bandwidth being reused if TE link is available as shown in FIG. 7. The conflict matrix 124 shown in FIG. 7 has been updated to reflect the bandwidth consumption from the first and second protecting paths 112b and 112c, and to reflect that a portion of the working path 110a bandwidth is reused (e.g., as shown with respect to link (0,1) in case of failures of $\psi_2$ or $\psi_3$, link (2,3) in case of failure of $\psi_1$, for example.

An exemplary embodiment of a logic sequence 150 executed by the node $102_0$ to set up multi-SRLG links failure protection connections 112b-c for the working path 110a may be implemented similarly to the logic sequence 130 (e.g., by being executed by the processor 105 of the node $102_0$), and may proceed as follows:

The logic sequence 150 begins with a step 152, which includes the node $102_0$ determining the SRLGs (e.g., $\psi_1$, $\psi_2$, $\psi_3$) of the working path 110a and the demand for the working path 110a. For example, the node $102_0$ may read the network 100a topology and information from one or more databases such as a Traffic Engineering Database, which is well known in the art, to determine the links 114 and intermediate nodes 102 that are included in the SRLGs of the working path 110a.

In a step 154, the node $102_0$ may select a protecting path (e.g., 112b-c) through the network 100a, for example, between the headend node $102_0$ and the tailend node $102_3$.

In a step 156, the node $102_0$ may access its conflict matrix 124.

In a step 158, the node $102_0$ may calculate, or otherwise determine a bitmap for the protecting path (e.g., 112b-c) selected in step 154. The bitmap is indicative of whether the selected protecting path 112b-c protects the working path 110a in case of failures of the SRLGs (e.g., $\psi1$, $\psi2$, $\psi3$) of the working path 110a.

Next, in a decision step 140, the node $102_0$ determines if the selected protecting path 112b-c protects the working path 110a against a failure of at least one of the SRLGs of the working path 110a, for example by accessing the bitmap. As described above, the bitmap may include a bit, a flag or other suitable identifier, identifying whether the selected protecting path 112b-c protects the working path 110a against failure for at least one of the SRLGs of the working path 110a (e.g., 1 for yes, and 0 for no).

If the selected protecting path 112b-c does not protect the working path 110a against a failure of at least one of the SRLGs of the working path 110a (e.g., $\psi_1$, $\psi_2$, $\psi_3$), the selected protecting path may be discarded in a step 162, and the sequence 150 may cycle back to step 154.

If the selected protecting path 112b-c does protect the working path 110a against a failure of at least one of the SRLGs of the working path 110a (e.g., as indicated by the bitmap), the node $102_0$ may save the selected protecting path 112b-c in a step 164.

In a decision step 166, the node $102_0$ determines if the selected protecting path(s) 112b-c protect against failure of all of the SRLGs of the working path 110a. If not, the sequence 150 cycles back to step 154.

If the selected protecting path(s) 112b-c protect against failure of all of the SRLGs of the working path 110a, the selected protecting paths 112b-c are set up in a step 170. If not, the sequence 150 cycles back to step 154.

In a step 172, the conflict matrix 124 of the node $102_0$ is updated.

In a step 174, the node $102_0$ transmits an advertising message to one or more second nodes 102 in the network 100a, including the protection type (e.g., two protecting paths in this case), the working path identification, demand, and SRLGs, the selected protecting paths (e.g., 112b and 112c), and the bitmap for each of the selected protecting paths 112b and 112c.

The sequence 150 ends in a step 176.

As will be appreciated by persons of ordinary skill in the art, the failure protection as described herein protect the working path 110a from failures in any one of the SRLGs of the working path 110a by via protecting paths 112b-c, for example, activating an appropriate protecting path 112b or 112c depending on which of the SRLGs of the working path 110a fails, with only one protecting path 112b-c being active at any one time. In this instance, the protecting path 112b protects against a failure of SRLGs $\psi_1$, $\psi_2$, and the protecting path 112b protects against failure of SRLG $\psi_3$. The protecting paths 112b and 112c cooperate with one another to protect the working path 110a from failures of any of the SRLGS of the working path 110a. As will be appreciated by a person of ordinary skill in the art, the protecting path 112b may be activated in case of a failure of SRLGs $\psi_1$ or $\psi_2$, and the protecting path 112c may be activated in case of failure of SRLG $\psi_3$. This protecting path configuration assumes that a portion of the bandwidth reserved for the working path 110a where the respective protecting path 112b (e.g., link 2-3) or 112c (e.g., link 0-1) overlaps with the working path 110a will be reused as shown in the conflict matrix 124 in FIG. 7.

Figures 9, 10:
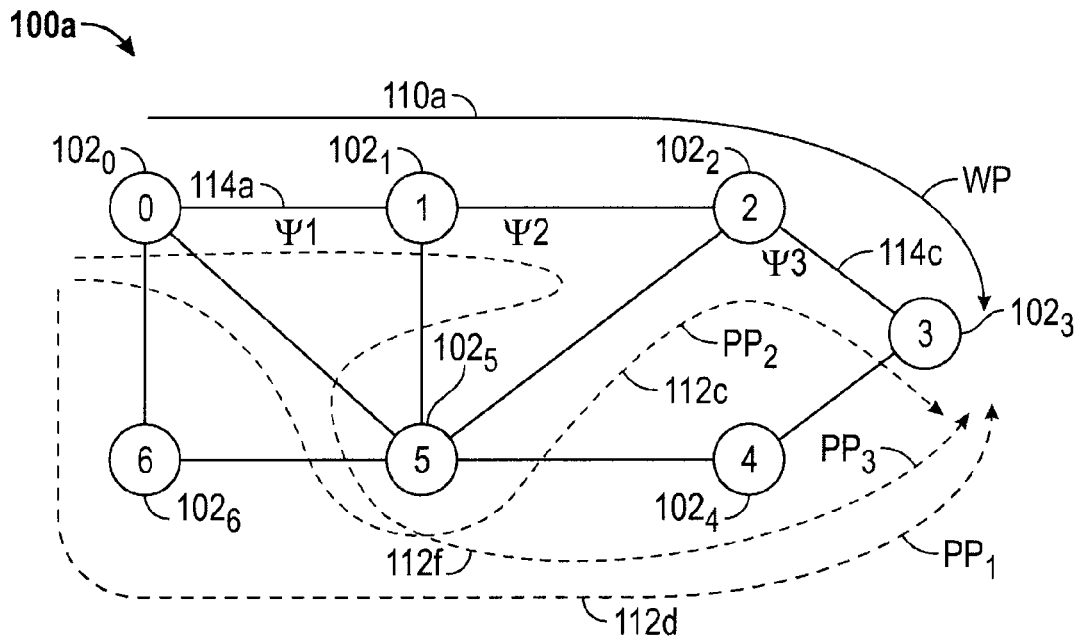
FIG. 9 is an exemplary embodiment of a connection including a working path and three protecting paths according to the inventive concepts disclosed herein.
FIG. 10 shows a conflict matrix updated after to reflect protecting paths of FIG. 9.

Referring now to FIGS. 9-10, in another exemplary embodiment, the headend node $102_0$ may attempt to set up the working path 110a and multiple protecting paths 112d-f (e.g., a set of protecting paths) to protect against multi-SRLGs failing in the working path 110a, such as three protecting paths: a first protecting path 112d (PP1), a second protecting path 112e (PP2), and a third protecting path 112f (PP3) in the network 100a. The first protecting path 112d may utilize nodes $102_0$-$102_6$-$102_5$-$102_4$-$102_3$, the second protecting path 112e may utilize nodes $102_0$-$102_5$-$102_2$-$102_3$, and the third protecting path 112f may utilize nodes $102_0$-$102_1$-$102_2$-$102_5$-$102_4$-$102_3$. In this instance, the headend node $102_0$ may advertise to the nodes $102_{0-6}$ of the network 100a the following information:

Demand D1 with 10 G capacity.
Protection type: Multi-SRLGs failure recovery
Working Path 110a SRLGs={$\psi_1$, $\psi_2$, $\psi_3$}
Protecting Path 1 (112d)={0-6-5-4-3}, Bitmap={1,1,1}
Protecting Path 2 (112e)={0-5-2-3}, Bitmap={1,1,0}
Protecting Path 3 (1120={0-1-2-5-4-3}, Bitmap={0,0,1}

This example assumes this working path 110a is desired to recover for any two (or multiple) SRLGs failures, as will be appreciated by persons of ordinary skill in the art having the benefit of the instant disclosure.

The conflict matrix 124b shown in FIG. 9 has been updated to reflect the bandwidth consumption of the first, second, and third protecting paths 112d, 112e, and 112f. As will be appreciated by persons of ordinary skill in the art, the first protecting path 112d protects the working path 110a in case of failure of any one of the SRLGs $\psi_1$, $\psi_2$, or $\psi_3$), the protecting path 112e protects the working path 110a in case of failure of risks $\psi_1$ and/or $\psi_2$, and not $\psi_3$, and the protecting path 112f protects the working path 110a in case of failure of risk $\psi_3$, and not $\psi_1$ and/or $\psi_2$. Further, it is to be appreciated that one of the protecting paths 112d, 112e, or 112f is activated at any one time as a result of a failure of the SRLGs of the working path 110c. As shown in FIG. 9, the bandwidth consumption on the links (0-5), (1-5), and (2-5) has been updated to reflect the bandwidth reserved on these links in case of a second SRLG failure in the working path 110a.

A logic sequence to determine the protecting path 112d-f may be implemented similarly to the logic sequence 150, except that step 166 may be changed to determine if the selected protecting paths protect against failures of two or more of the SRLGs of the working path 110a, as will be appreciated by persons of ordinary skill in the art having the benefit of the instant disclosure. Further, as will be appreciated by persons of ordinary skill in the art having the benefit of the instant disclosure, any desired number of protecting paths 112a-f may be set up for a working path 110a according to the inventive concepts disclosed herein.

Referring now to FIG. 11, the local calculation of a conflict matrix 124a at a node 102 (e.g., the headend node $102_0$, an intermediate node $102_1$-$102_6$, or the tailend node $102_3$) in a network (e.g., the network 100a) having ten links ($L_1$-$L_{10}$) for multiple demands, including a demand 1 (D1) of 100 G, a demand (D5) of 40 G, and a demand 8 (D8) of 5 G may be carried out by maintaining an aggregated view of the conflict matrix 124a for path computation, and updating the conflict matrix 124a when a new connection request arrives and/or an old connection request terminates. The bandwidth values for each link $L_1$-$L_{10}$ in the conflict matrix 124a element ($\psi_i$, Lj) represent the sum of all the demand (D1+D5+D8) that gets protected over the particular link Lj and are affected by a SRLG as will be appreciated by persons of ordinary skill in the art having the benefit of the instant disclosure.

It is to be understood that the inventive concepts disclosed herein are applicable to both connection-based advertisement models and to link-based or element-based advertisement models. For example, in connection-based advertisement model, each connection may trigger one advertisement. Each advertisement has sufficient information that any other node needs to know to update its conflict matrix. As another example, in link-based or element-based advertisement model, where a node advertises changes to TE link resources, each connection addition may trigger multiple link state advertisement (LSA) updates, and the number of updates is proportional to the number of rows that are affected in the conflict matrix.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations may have been described as "components" or "circuitry" that performs one or more functions. The term "component" or "circuitry" may include hardware, such as a processor, an application specific integrated circuit (ASIC), or a field programmable gate array (FPGA), or a combination of hardware and software.

Further, while implementations have been described in the context of an optical network, this need not be the case. These implementations may apply to an electronic network using copper cabling, or even a wireless network.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A node, comprising: an input interface for receiving traffic from a first communication link; an output interface for transmitting traffic to a second communication link; a switch for communicating the traffic from the input interface to the output interface; and a control module controlling the input interface, the output interface, and the switch, the control module generating an advertising message including: a working path bandwidth demand; an identification of at least two communication links in a shared risk link group of the working path; and at least one protecting path and a bitmap indicative of failure of at least one first communication link in the shared risk link group that causes the at least one protecting path to be used, wherein the working path includes a first set of intermediate nodes and communication links, and wherein the at least one protecting path has a second set of intermediate nodes, the first set and the second set at least partially overlapping with one another, and wherein the at least one protecting path is a first protecting path, and wherein the advertising message further includes at least one second protecting path and a bitmap indicative of failure of at least one second communication link in the shared risk link group that causes the at least one second protecting path to be used.

2. The node of claim 1, wherein the working path includes a first set of intermediate nodes and communication links, and wherein the at least one protecting path includes a second set of intermediate nodes and communication links, the first set and the second set not overlapping with one another.

3. A node, comprising: an input interface for receiving traffic from a first communication link; an output interface for transmitting traffic to a second communication link; a switch for communicating the traffic from the input interface to the output interface; and a control module controlling the input interface, the output interface, and the switch, the control module generating an advertising message including: a working path bandwidth demand; an identification of at least two communication links in a shared risk link group of the working path; and at least one protecting path and a bitmap indicative of failure of at least one first communication link in the shared risk link group that causes the at least one protecting path to be used, wherein the at least one protecting path is a first protecting path, the working path is a first working path, and the advertising message is a first advertising message, and wherein the control module: in response to receiving a second advertising message including a second working path connection type, a second working path bandwidth demand; an identification of at least two communication links in a shared risk link group of the second working path, at least one second protecting path and a bitmap indicative of failure of at least one link in the shared risk link group of the second working path that causes the at least one second protecting path to be used, reserves bandwidth on the node for the second protecting path based on the second advertising message; and updates a conflict matrix indicative of the reserved bandwidth for the at least one second protecting path.

4. A node, comprising: an input interface for receiving traffic from a first communication link; an output interface for transmitting traffic to a second communication link; a switch for communicating the traffic from the input interface to the output interface; a control module controlling the input interface, the output interface and the switch, the control module generating an advertising message including: a working path protection type, the working path protection type being multi-failure recovery protection; a working path bandwidth demand; an identification of at least two communication links in a shared risk link group of the working path; a set of protecting paths including: a first protecting path and a bitmap indicative of failure of a first communication link in the shared risk link group that causes the at least one protecting path to be used; and at least one second protecting paths and a bitmap indicative of failure of at least one second communication link in the shared risk link group that causes the at least one second protecting path to be used; wherein the working path includes a first set of intermediate nodes and communication links, and wherein the set of protecting paths has a second set of intermediate nodes, the first set and the second set at least partially overlapping with one another.

5. The node of claim 4, wherein the first protecting path and the at least one second protecting path cooperate to protect the working path against failures of the first communication link in the shared risk link group and the at least one second communication link in the shared risk link group.

6. The node of claim 4, wherein the set of protecting paths protects the working path from failures of the at least two links in the shared risk link group if the working path.

7. The node of claim 4, wherein the working path is a first working path and the advertising message is a first advertising message, and wherein the control module: in response to receiving a second advertising message including a second working path bandwidth demand; an identification of at least two links in a shared risk link group of the second working path, at least one third protecting path and a bitmap indicative of failure of at least one link in the shared risk link group of the second working path that causes the at least one third protecting path to be used, reserves bandwidth for the at least one third protecting path based on the second advertising message; and updates a conflict matrix indicative of the reserved bandwidth for the at least one third protecting path.

* * * * *